United States Patent [19]

Watanabe et al.

[11] Patent Number: 4,648,425
[45] Date of Patent: Mar. 10, 1987

[54] SYSTEM AND METHOD OF CONFIRMING OPERATION OF A STEAM RELIEVING SAFETY VALVE FOR A WATER-COOLED NUCLEAR REACTOR

[75] Inventors: Kenshu Watanabe, Mito; Tadashi Uchikawa, Oarai; Masashi Takiyama, Tokyo; Takashi Kurahashi, Tsuruga, all of Japan

[73] Assignee: Doryokuro Kakunenryo Kaihatsu Jigyodan, Tokyo, Japan

[21] Appl. No.: 179,879

[22] Filed: Aug. 20, 1980

[30] Foreign Application Priority Data

Sep. 10, 1979 [JP] Japan .................. 54-115973

[51] Int. Cl.4 ............................................ F16K 37/00
[52] U.S. Cl. .................. 137/557; 73/40.5 A; 116/70; 376/377
[58] Field of Search ............. 137/524, 577; 176/19 R, 176/19 J, 19 LD, 65; 116/264, 266, 70; 73/39, 40, 40.5; 60/644, 646, 657

[56] References Cited

U.S. PATENT DOCUMENTS

| | | | |
|---|---|---|---|
| 2,895,503 | 7/1959 | Lederer | 116/70 X |
| 3,114,414 | 12/1963 | Judd | 176/65 |
| 3,235,463 | 2/1966 | Sankovich | 176/65 |
| 3,500,676 | 3/1970 | Palmer | 73/40.5 A X |
| 3,844,310 | 10/1974 | Brindisi | 137/557 |
| 3,945,245 | 3/1976 | Stehle et al. | 73/40.5 A X |
| 4,020,693 | 5/1977 | Ahlgren et al. | 176/19 R |

Primary Examiner—A. Michael Chambers
Attorney, Agent, or Firm—Wenderoth, Lind & Ponack

[57] ABSTRACT

A system and a method of confirming the operation of a steam relieving safety valve for a water-cooled nuclear reactor are provided. Acoustic vibration generated by steam relieved from the safety valve when the latter is opened is detected by an acoustic emission sensor. The acoustic emission sensor is mounted on the safety valve or a steam relief pipe connected to the safety valve.

6 Claims, 4 Drawing Figures

SYSTEM AND METHOD OF CONFIRMING OPERATION OF A STEAM RELIEVING SAFETY VALVE FOR A WATER-COOLED NUCLEAR REACTOR

BACKGROUND OF THE INVENTION

The present invention relates to a steam relieving safety valve assembly for a water-cooled type nuclear reactor in which water is used as a primary coolant, and a method of confirming the operation or functioning of a steam relieving safety valve of the water-cooled type nuclear reactor from a remote location without delay and without fail.

Regulations require the installation of a steam relieving safety valve (referred to simply as "safety valve", hereinafter) on boilers to relieve the internal pressure when it is increased in a level 6% higher than the maximum operation pressure.

In case of water-cooled nuclear reactors, it is necessary to make some suitable measure for confirming the safe operation of the safety valve attached to a steam drum from a remote location, because the safety valve, which is installed in an environment of high temperature and high level of radioactivity, is inaccessible.

Hitherto, the confirmation of operation of the safety valve has been made by means of a thermocouple disposed in a steam relief pipe leading from the safety valve so as to detect the temperature rise due to the blow out of the steam, i.e. the functioning of the safety valve. This conventional method, however, has a drawback that the operation of the safety valve for a short period of time cannot be correctly sensed because of the poor response characteristic of the thermocouple attributable to the large time constant thereof.

SUMMARY OF THE INVENTION

An object of the present invention is to provide an improvement in which the operation of a safety valve of the above type is correctly sensed.

Another object of the present invention is to provide a novel safety valve assembly which permits a correct and immediate confirmation of an operation of the safety valve.

A further object of the present invention is to provide a method of confirming the operation of the safety valve from a remote location at a high sensitivity and with a good response, to therby overcome the above-described problems of the prior art.

Briefly, the present invention provides an improved safety valve assembly and a method, in which the thermocouple in the conventional system is replaced by an acoustic emission sensor (referred to as "AE sensor" hereinafter) adapted to detect acoustic vibration generated as a result of discharge of the steam when the safety valve is opened.

The AE sensor is mounted on the safety valve or a steam relief pipe connected to the safety valve. In the present specification, the term "a safety valve" is used to include a safety valve body and solid portions which are rigidly attached to the safety valve body. These solid portions include, for example, protrusions directly extending from the safety valve body and equipment, such as gauges, attached to the protrusions near the safety valve.

The AE sensor has a time constant of an order of $10^{-6}$ second which is much smaller than that of a thermocouple sensor which is about $10^{-3}$ second, so that the system embodying the method of the invention can detect the operation of the safety valve at a high sensitivity and well following up the operation of the safety valve.

DETAILED DESCRIPTION OF THE INVENTION

A preferred embodiment will be described hereinunder with reference to the accompanying drawings.

Figure 1:
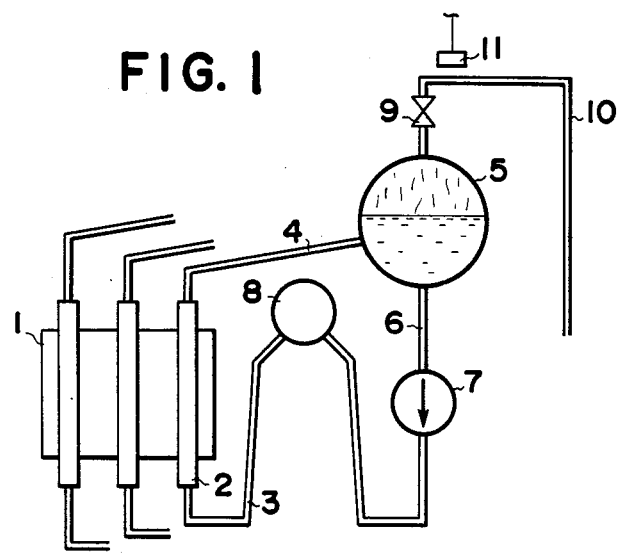
FIG. 1 is a diagramatic view of the inventive safety valve assembly and equipment associated therewith, showing an acoustic emission sensor mounted on a steam relieving pipe.

FIG. 1 shows a pressure-tube type nuclear reactor to which the method of the invention is applied. Since the construction of this type of nuclear reactor is known, the construction will be explained simply in connection with its operation.

The nuclear reactor body is constituted by a calandria tank 1, pressure tubes 2, assemblies and shield (not illustrated). The calandria tank 1 is filled with heavy water as a moderator, while the pressure tubes 2 are inserted into calandria pipes which are arranged in the form of a square lattice. The fuel assemblies are disposed within the pressure tubes 2 and are cooled by light water as a coolant flowing from the bottom of the reactor core through inlet pipes 3. The coolant is heated and boiled by the heat generated as a result of nuclear reaction to assume the state of two-phase flow of water and vapor, and flows into a steam drum 5 through riser tubes 4. The steam drum 5 has a vapor-water separator adapted to separate the vapor and water from each other. The vapor is then sent as steam for driving a turbine (not shown), while the water is recirculated to the pressure tubes 2 through a pipe 6, header 8 and inlet pipe 3 by means of a recirculation pump 7. A steam relief pipe 10 is connected to the steam drum 5 via a steam relieving safety valve 9.

Figure 4:
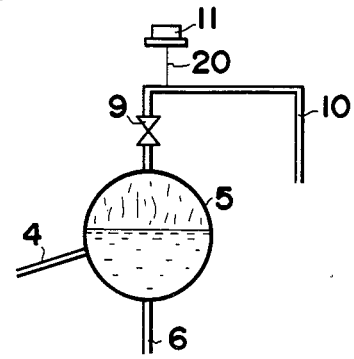
FIG. 4 is a diagramatic view of another embodiment of the inventive safety valve assembly showing an acoustic emission sensor mounted to a steam relieving pipe via a solid waveguide member.
Figure 2:
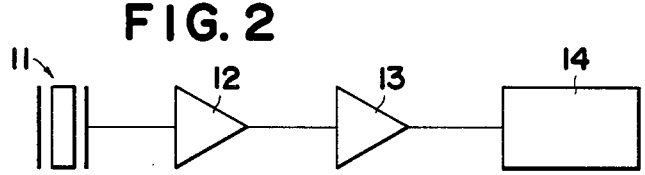
FIG. 2 is a block diagram, illustrating the method of confirming the operation of the safety valve.

According to the invention, a contact type AE sensor 11 such as a PZT is attached to the safety valve 9 or to the portion of the steam relief pipe 10 connected to the safety valve 9. The AE sensor may be adhered to the wall of the steam relief pipe 10 directly by means of an adhesive, as shown in FIG. 1. Alternatively, as shown in FIG. 4, the AE sensor 11 may be attached through the medium of a solid waveguide rod 20. As will be seen from FIG. 2, an electric signal coming from the AE sensor 11 is transmitted to an amplifier 13 incorporating a filter, via a pre-amplifier 12, and is measured by an effective volt meter 14.

Assuming here that the safety valve 9 is opened to relieve the steam, an acoustic vibration of ultrasonic frequency range is generated in the body of the safety valve 9 and in the steam relief pipe 10. The AE sensor converts this acoustic vibration into an electric signal which then is amplified by the aforementioned preamplifier 12 and the main amplifier 13, and this amplified signal is measured by the effective volt meter 14. The change of effective voltage in relation to time can be recorded if a suitable recording device is connected to the volt meter 14.

A practical example of the confirmation of operation of the safety valve, in accordance with the method of the invention, will be described hereinunder. This example is to confirm the operation of a safety valve attached to the steam drum of a pressure-tube type nuclear reactor which operates at a pressure of 70 Kg/cm$^2$ and a temperature of 280° C. A wide-band type sensor having a sensitivity range of between 100 KHz and 2 MHz was used as the AE sensor. The band-path filter in the main amplifier was set to pass frequencies of between 300 KHz and 2 MHz. The gains of the preamplifier and the main amplifier were set at 40 dB and 20 dB, respectively. The result of the measurement is shown in FIG. 3.

Figure 3:
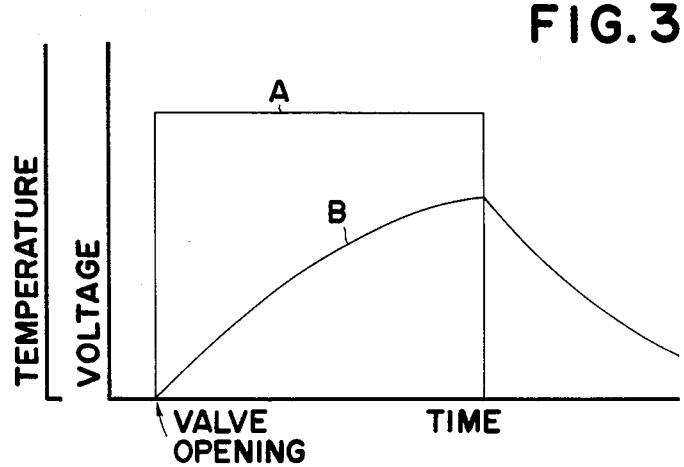
FIG. 3 is a graph showing an example of the result of an actual measurement in accordance with the method of the invention.

In FIG. 3, a curve A represents the change of the output of the effective volt meter in relation to time, while a curve B shows the change of temperature in the steam relief pipe in relation to time. Thus, the curve B corresponds to the characteristic of the conventional system incorporating a thermocouple. From FIG. 3, it will be seen that the system and method of the invention make it possible to confirm the operation of the safety valve without substantial delay and without fail, even when the operation time is short.

As has been described, the system and method of the invention offer various advantages. Namely, the AE sensor can simply be mounted to the outside of the safety valve or the steam relief pipe and need not be mounted within the steam relief pipe as in the case of a thermocouple, so that the system as a whole can have distinguished durability and strength.

In addition, since this method relies upon the detection of the acoustic vibration generated as a result of the discharge of steam when the safety valve is opened, and does not make use of the temperature change in the steam relief pipe, it is possible to confirm the operation of the safety valve at a high responsiveness and sensitivity well following up the operation of the safety valve, even when the operation time is short.

Though the present invention has been described with reference to a preferred embodiment thereof, many modifications and alterations may be made within the scope of the invention.

What is claimed is:

1. In a water cooled nuclear reactor of the type in which water is used as a primary coolant and including a steam drum, a steam relief pipe, and a steam relieving safety valve disposed between said steam drum and said relief pipe, said safety valve being opened to relieve the internal pressure in said steam drum when said interval pressure increases over a predetermined maximum pressure, the improvement comprising:

means for detecting an opened condition of said safety valve and thereby for confirming proper operation thereof, said detecting and confirming means comprising contact type acoustic emission sensor means, mounted solely on the exterior of at least one of said safety valve and said steam relief pipe, for detecting acoustic vibrations which are generated by steam being relieved from said safety valve when said safety valve is opened and which are transmitted through a solid material of said at least one of said safety valve and said steam relief pipe.

2. The improvement claimed in claim 1, wherein said acoustic emission sensor means is directly fastened to said at least one of said safety valve and said steam relief pipe.

3. The improvement claimed in claim 1, wherein said acoustic emission sensor means is connected to said at least one of said safety valve and said steam relief pipe by means of a solid waveguide member.

4. The improvement claimed in claim 1, wherein said acoustic emission sensor means is electrically connected to a voltmeter via an amplifier, whereby said acoustic vibrations generated by steam relieved from said safety valve are converted into an electric signal by said acoustic emission sensor means and then measured by said voltmeter after said electric signal is amplified by said amplifier.

5. A method of confirming the operation of a steam relieving safety valve installed between a steam drum and a steam relief pipe of a water cooled nuclear reactor of the type in which water is used as a primary coolant, said safety valve being opened to relieve the internal pressure in said steam drum when said internal pressure increases over a predetermined maximum pressure, said method comprising:

mounting a contact type acoustic emission sensor solely on the exterior of at least one of the safety valve and the steam relief pipe;

detecting by means of said acoustic emission sensor vibrations which are generated by steam being relieved from said safety valve when said safety valve is opened and which are transmitted through a solid material of said at least one of said safety valve and said steam relief pipe;

converting the thus detected vibrations into an electrical signal; and detecting said electrical signal.

6. A method as claimed in claim 5, further comprising amplifying said electrical signal, and measuring the thus amplified electrical signal by means of a voltmeter.

* * * * *